(12) United States Patent
Caillot et al.

(10) Patent No.: US 9,845,076 B2
(45) Date of Patent: Dec. 19, 2017

(54) WINDSHIELD WIPER-ATTACHMENT DEVICE HAVING A SAFETY POSITION, CONNECTOR AND ADAPTER FOR SUCH A DEVICE, AND WIPING SYSTEM COMPRISING SAID ATTACHMENT DEVICE

(71) Applicant: Valeo Systèmes d'Essuyage, Le Mesnil Saint Denis (FR)

(72) Inventors: Gérald Caillot, Cernay la Ville (FR); Jean-Michel Jarasson, Le Mesnil St Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 441 days.

(21) Appl. No.: 14/354,411

(22) PCT Filed: Oct. 24, 2012

(86) PCT No.: PCT/EP2012/071052
§ 371 (c)(1),
(2) Date: Jun. 9, 2014

(87) PCT Pub. No.: WO2013/060723
PCT Pub. Date: May 2, 2013

(65) Prior Publication Data
US 2014/0259507 A1    Sep. 18, 2014

(30) Foreign Application Priority Data
Oct. 25, 2011 (FR) ...................................... 11 59651

(51) Int. Cl.
*B60S 1/40*    (2006.01)
*B60S 1/38*    (2006.01)

(52) U.S. Cl.
CPC ........... *B60S 1/3858* (2013.01); *B60S 1/3849* (2013.01); *B60S 1/3868* (2013.01); *B60S 1/4048* (2013.01);
(Continued)

(58) Field of Classification Search
CPC .... B60S 1/3848; B60S 1/3849; B60S 1/4038; B60S 1/4045; B60S 1/4048;
(Continued)

(56) References Cited

U.S. PATENT DOCUMENTS

| | | | |
|---|---|---|---|
| 6,599,051 B1* | 7/2003 | Jarasson | B60S 1/4038 15/250.32 |
| 2006/0059647 A1* | 3/2006 | Ostrowski | B60S 1/3868 15/250.32 |

(Continued)

FOREIGN PATENT DOCUMENTS

| | | |
|---|---|---|
| DE | 20 2004 012300 U1 | 8/2005 |
| DE | 10 2008 049 273 A1 | 4/2010 |

(Continued)

OTHER PUBLICATIONS

International Search Report for corresponding International Application No. PCT/EP2012/071052, dated Jan. 18, 2013 (2 pages).

(Continued)

*Primary Examiner* — Gary Graham
(74) *Attorney, Agent, or Firm* — Osha Liang LLP

(57) ABSTRACT

The invention relates to a device for attaching a windshield wiper blade to a drive arm of a wiping system. The device comprises a connector attached to the blade and an adapter (9) for connecting the connector to the arm, said adapter (9) including holding means (20) for holding same in a nominal locking position on the arm. According to the invention, the connector and/or the adapter (9) comprise safety means (70) that allow the arm to be retained in the nominal locking (Continued)

Figure 1:
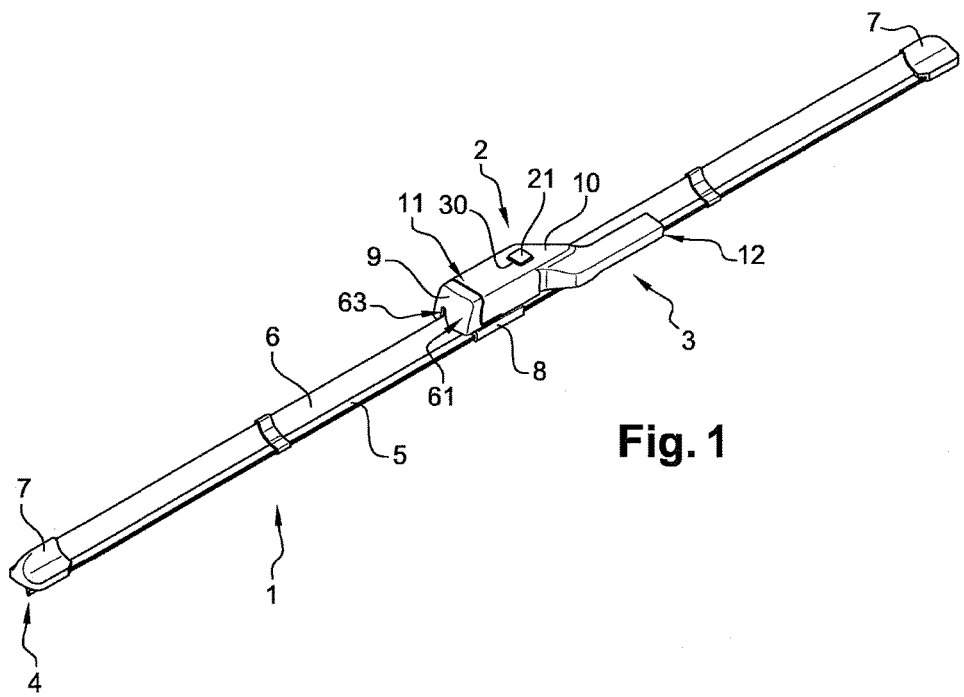

position upon failure of the holding means (20), said safety means (70) being configured to allow the adapter (9) to be mounted on and/or removed from the arm during nominal operation. The invention also relates to such a connector and such an adapter, as well as to a wiping system comprising such an attachment device.

6 Claims, 3 Drawing Sheets

(52) U.S. Cl.
CPC .................. *B60S 2001/4051* (2013.01); *B60S 2001/4054* (2013.01); *B60S 2001/4058* (2013.01)

(58) Field of Classification Search
CPC ...... B60S 2001/4051; B60S 2001/4054; B60S 2001/4058; B60S 1/3868
USPC ....................................... 15/250.32
See application file for complete search history.

(56) References Cited

U.S. PATENT DOCUMENTS

| | | | |
|---|---|---|---|
| 2009/0064438 A1* | 3/2009 | Boland | ................. B60S 1/3848 15/250.32 |
| 2011/0247166 A1 | 10/2011 | Depondt et al. | |

FOREIGN PATENT DOCUMENTS

| | | | |
|---|---|---|---|
| DE | 10 2008 049272 A1 | | 4/2010 |
| DE | 10 2009 029458 A1 | | 3/2011 |
| FR | 2886253 | * | 12/2006 |

OTHER PUBLICATIONS

Search Report for corresponding French Application No. 1159651, dated Jun. 8, 2012 (5 pages).

* cited by examiner

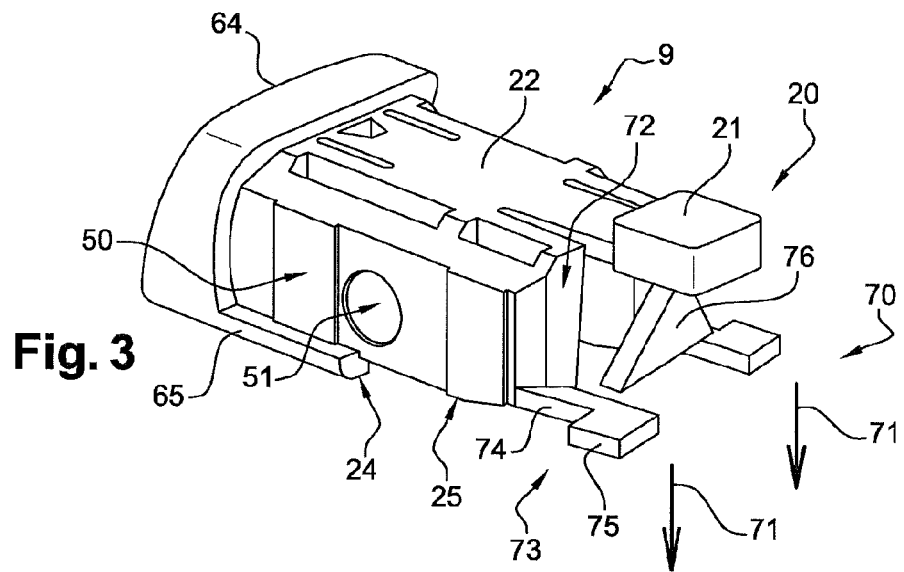
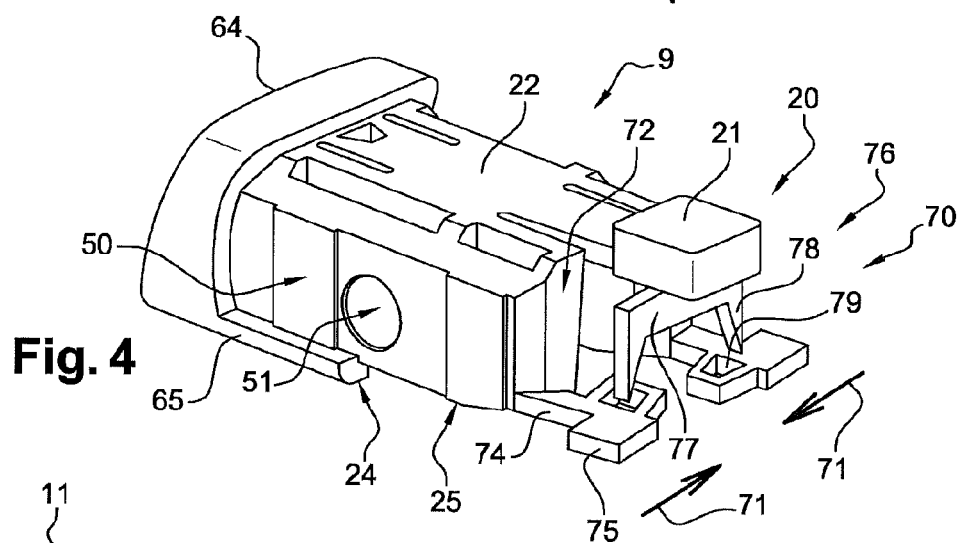
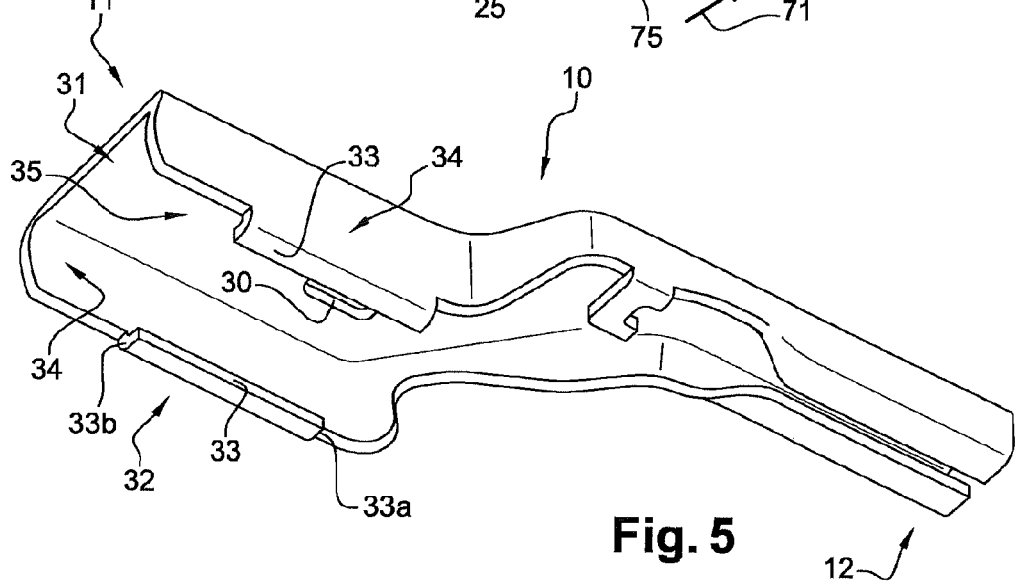

WINDSHIELD WIPER-ATTACHMENT DEVICE HAVING A SAFETY POSITION, CONNECTOR AND ADAPTER FOR SUCH A DEVICE, AND WIPING SYSTEM COMPRISING SAID ATTACHMENT DEVICE

The field of the present invention is that of vehicle equipment and more particularly that of motor vehicle windshield wiping equipment.

Motor vehicles are routinely equipped with windshield wiper systems for clearing the windshield of what may block the view of the passengers in the vehicle, in particular its driver. These windshield wipers conventionally include a driving arm effecting an angular to-and-fro movement and elongate wipers themselves carrying wiper blades made from an elastic material. These blades run against the windshield and evacuate the water out of the field of view of the driver. The wipers take the form either, in a standard version, of articulated brackets that hold the wiper blade at a plurality of discrete locations conferring on it a curvature enabling it to espouse any curvature of the windshield or, in a more recent so-called "flat blade" version, of a semi-rigid assembly that holds the wiper blade over all its length thanks to one or more curvature vertebrae enabling the wiper to be applied to the windshield without having to use brackets.

In both solutions, the wiper is attached to the rotating wiper arm by a fixing device consisting of a connector and an adapter. The connector is a part that is crimped directly to the wiper blade or directly to the flat blade while the adapter is an intermediate part enabling fixing of the connector to the wiper arm. These two parts are connected to each other by a transverse pivot pin that allows relative rotation thereof in a plane perpendicular to the windshield passing through the arm.

Such adapters are known including one or more flexible locking pegs that clip onto the arm so as to lock the adapter onto the latter. However, it is necessary to anticipate a fault, such as disengagement of the peg or pegs, that would risk leading to unwanted separation of the arm and the wiper.

Fixing devices have already been proposed to address this risk that are configured to enable locking of the wiper in a retracted position. To be more precise, in the event of failure of the peg, the wiper is free to move in translation relative to the fixing device over a predetermined travel in a direction located in a plane perpendicular to the pivot pin of the adapter on the connector. At the end of travel, an abutment located on the arm comes into contact with an abutment located on the fixing device of the wiper. In other words, in the event of failure, the wiper in position on the windshield is free to move in translation between its nominal position fixed to the arm and the position of contact between said abutments.

Such a solution is not entirely satisfactory and the invention aims to improve on this situation.

To this end it proposes a device for fixing a windshield wiper to a drive arm of a wiping system, said device including a connector fixed to the wiper and an adapter for connecting the connector to said arm, said adapter including means for retaining it in a nominal locking position on the arm.

In accordance with the invention, said connector and/or said adapter includes safety means enabling retention of the arm in the nominal locking position in the event of failure of said retaining means, said safety means being configured to allow mounting and/or demounting of the adapter on/from the arm in normal operation.

As a result the invention makes it possible to limit the risk of disengagement of the wiper in the event of failure of the retaining means in accordance with a solution in which the wiper is held in place even after failure of said means. The liability of the device is therefore improved. Moreover, the wiper is locked against movement in translation relative to the arm only when the wiper is held pressed against the windshield of the vehicle it equips, thus enabling it to be demounted once the arm has been raised.

In accordance with different embodiments of the invention that may be employed separately or in combination:
- said connector includes two substantially symmetrical, preferably entirely symmetrical, flanges connected to each other, sandwiching the wiper, at the level of the vertebrae of said wiper,
- said connector is in one piece,
- said connector is fixed to the wiper with no degree of freedom,
- said connector includes an orifice configured to receive a lug enabling rotation between the adapter and the connector,
- said adapter is connected to the connector with a degree of freedom in pivoting about a pivot pin,
- said adapter is configured to be mounted on the arm in a so-called mounting direction located in a plane perpendicular to the pivot pin,
- said adapter includes lateral flanges at the level of which the connector is articulated by means of an orifice,
- said lateral flanges are connected to an upper face of the adapter and are substantially symmetrical, preferably entirely symmetrical,
- said adapter defines between said lateral flanges a housing for at least part of the connector receiving said lug,
- said adapter has a substantially U-shaped cross section,
- said adapter includes means for maintaining it in a nominal locking position taking the form of a retractable peg provided on an upper face of the adapter,
- said arm includes an opening of complementary shape to that of said peg,
- said peg is accommodated in said opening of said arm in order to lock the wiper to the arm in a nominal locking position.

In accordance with a first variant, the safety means are located on the connector. In such a variant, the invention may have one or more of the following features:
- the safety means include at least one abutment enabling rotation of the arm about the pivot pin of the adapter, preferably two abutments,
- the abutment is configured to block mounting and demounting of the adapter on/from the arm if the angle of rotation of said arm and/or said adapter relative to their nominal position is less than a limit angle and to allow mounting and demounting of the adapter on/from the arm otherwise,
- said abutment is cantilevered relative to the connector,
- said abutment is in one piece with the connector,
- said abutment is configured to block mounting and demounting of the adapter on/from the arm if the angle of rotation of said arm and/or said adapter relative to their nominal position is less than a limit angle and to allow mounting and demounting of the adapter on/from the arm otherwise,
- said limit angle is between 2° and 10°, notably between 4° and 6°,
- the safety means take the form of two retractable abutments, said two retractable abutments are substantially symmetrical, preferably entirely symmetrical, with respect to a plane perpendicular to the pivot pin.

In accordance with another variant, the safety means are located on the adapter. In such a variant, the invention may have one or more of the following features:

the retaining means are configured to act on the safety means so as to retract them during mounting and demounting of the adapter on/from the arm, the safety means include at least one abutment deformable in a so-called retraction direction, said deformable abutment originates from a rear edge of a lateral flange of the adapter, notably at the level of one end of said rear edge, said deformable abutment includes an arm connected to the rear edge of a lateral flange of the adapter and an abutment head connected to said arm of said deformable abutment, the safety means take the form of two retractable abutments, said two retractable abutments are substantially symmetrical, preferably entirely symmetrical, with respect to a plane perpendicular to the pivot pin, the retaining means include a cam acting on the abutment or abutments so as to drive them in said retraction direction, said cam is configured to act on the abutment head or heads, said cam has a rectangular shape, said cam has a triangular or trapezoidal shape, widening from the retaining means, preferably taking the form of a peg, said cam is in the form of a hook, said hook has a base connected to said retaining means and at least in part inscribed in a plane including a direction parallel to said pivot pin, and two guide rods configured to engage in respective orifices of the abutment heads, said two guide rods have respective triangular shapes, widening from their distal ends located in the nominal position facing said orifices of said abutment heads to said base of the hook, said two guide rods are separated from each other by a distance decreasing from their distal ends located in the nominal position facing said orifices of said abutment heads to said base of the hook, said cam is located in the vicinity of at least one abutment head without deforming it in the nominal position, preferably two abutment heads without deforming them in the nominal position, said cam is configured to push the abutment head or heads under slides of said arm, said retraction direction is located in a plane perpendicular to the pivot pin, said retraction direction is parallel to said pivot pin.

Moreover, in either of these variants, said adapter may be configured so that means for guiding movement in translation of the arm on the adapter in a direction located in a plane perpendicular to the pivot pin are in contact with the abutment or abutments of the safety means both in normal operation and in the event of failure of the retaining means. In accordance with this aspect of the invention, one or more of the following features may be employed:

said means for guiding movement in translation of the arm on said adapter take the form of slides provided at the level of lateral faces of the arm, the abutments of the safety means are in contact with a rear end of said slides in the event of failure of the retaining means, said movement in translation guide means serve to retain the arm on the adapter, said adapter has lower edges intended to cooperate with said slides, said slides are the same length, said slides are different lengths.

The invention will notably find an application as a fixing device for wipers with curvature vertebrae or "flat blade" wipers.

The invention also concerns a connector and an adapter of the fixing device described above.

The invention further concerns a wiping system including such a fixing device connecting the arm and the wiper of said system.

For example, said arm includes a support yoke intended to be connected to said fixing device.

The invention will be better understood and other objects, details, features and advantages thereof will become more clearly apparent in the course of the following detailed explanatory description of one embodiment of the invention given by way of purely illustrative and nonlimiting example with reference to the appended diagrammatic drawings.

Figure 2:
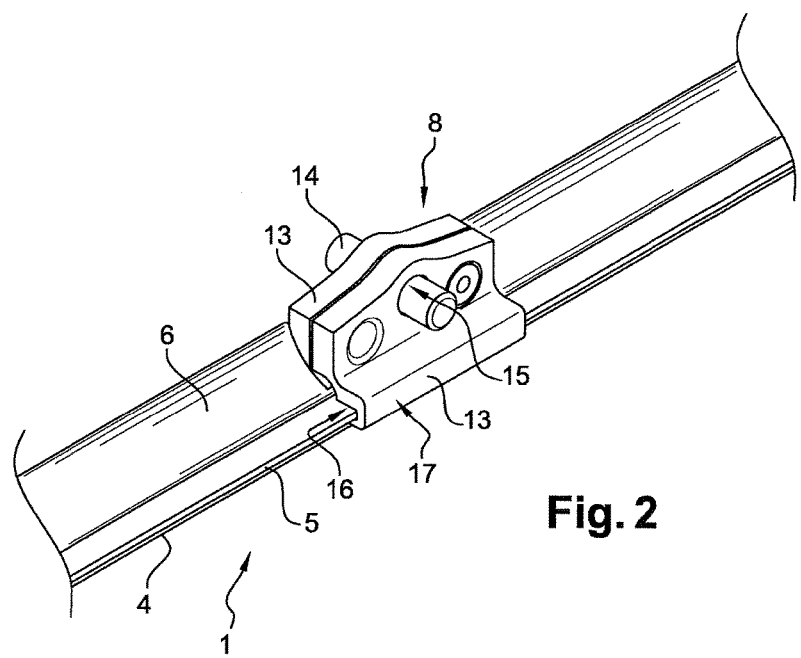
Figure 6:
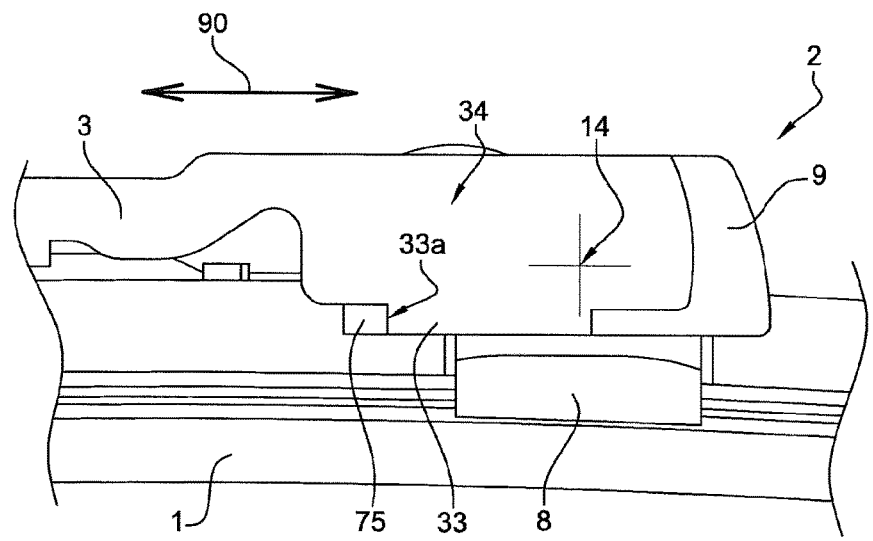
Figure 7:
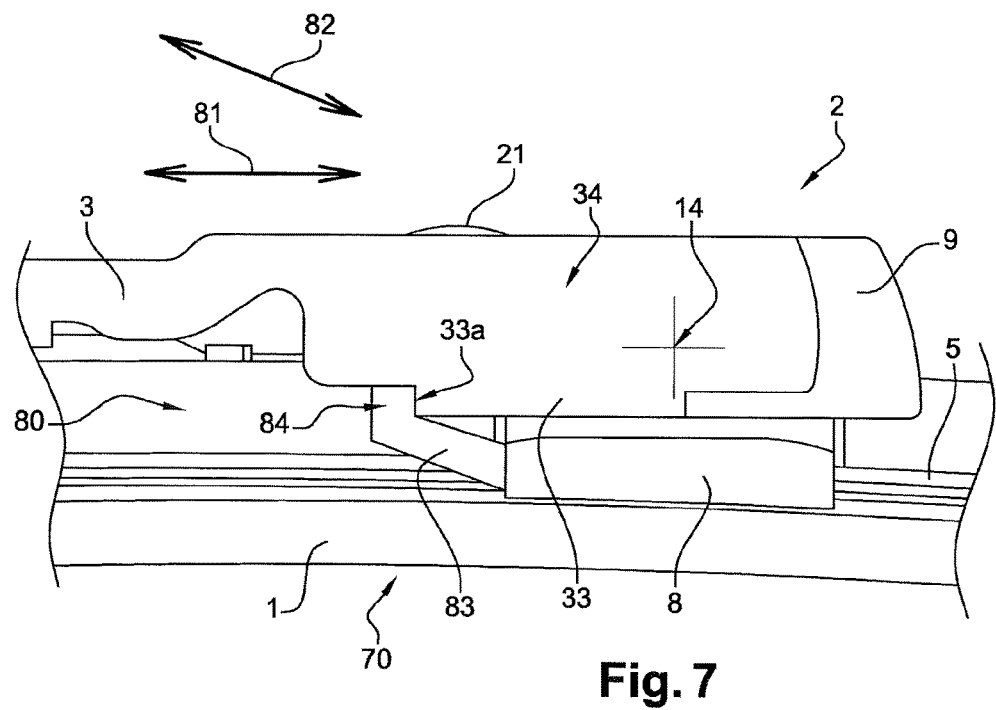

In these drawings:

FIG. 1 is a perspective view of one embodiment of a wiping system in accordance with the invention, the arm being shown only at the level of its yoke, FIG. 2 is a view of a detail from FIG. 1, showing only the wiper and the connector, FIG. 3 is a perspective view from above of a first embodiment of the adapter of the FIG. 1 wiping system, FIG. 4 is a perspective view from above of a second embodiment of the adapter of the FIG. 1 wiping system, FIG. 5 is a perspective view from below of the yoke of the FIG. 1 wiping system, FIG. 6 is a side view showing the FIG. 1 wiping system equipped with the adapter from FIG. 3 or 4 in the mounted position, FIG. 7 is a side view showing a variant embodiment of the FIG. 1 wiping system.

As shown in FIG. 1, the invention concerns a wiping or windshield wiper system including a wiper 1, a fixing device 2 and an arm 3 connected to the wiper 1 by the fixing device 2.

Here the wiper 1 includes a body provided with a wiper blade 4 and one or more vertebrae 5 imparting to the wiper a curvature enabling it to be applied correctly to the windshield. It also includes a deflector 6 and/or end-pieces 7 connecting the assembly together.

The fixing device 2 includes a connector 8 and an adapter 9 for connecting the connector 8 to said arm 3.

Here the arm 3 includes a support yoke 10 intended to be connected to said fixing device 2, in particular to the adapter 9, by a distal end 11. Said yoke 10 has a proximal end 12 fixed, for example crimped, to a rod, not shown, of the arm 3.

As shown in FIG. 2, the connector 8 is fixed to the wiper 1. This means that it is connected to the wiper with no degree of freedom.

For example, it includes two symmetrical flanges 13 connected to each other and sandwiching the wiper 1, here at the level of the vertebrae 5 of said wiper 1. Said flanges 13 each include for this purpose a groove 16 for housing said vertebrae, located in a lower portion 17 of the connector 8. In another variant, the connector 8 may be in one piece.

Said connector 8 includes a pivot pin 14, here passing through the flanges 13 at the level of an orifice 15 situated in an upper part of the connector 8. Said pivot pin 14 is intended to be oriented in a direction orthogonal to the wiper 1 in the plane tangential to the windshield.

As shown in FIGS. 3 and 4, the adapter 9 is configured to be connected to the connector 8, here with one degree of freedom in pivoting about the pivot pin 14. To this end it includes here an orifice 51 by means of which the adapter 9 is articulated on the pivot pin 14 of the connector 8.

Said adapter 9 includes means 20 for retaining it in a nominal locking position on the arm 3. For example, it is a flexible peg 21, here provided on an upper face 22 of said adapter.

As shown in FIG. 5, the yoke 10 of the arm includes, for example, an opening 30 of complementary shape to that of the peg 21. When mounting the adapter 9 in the arm 3, said peg 21 is accommodated in the opening 30, thus enabling the wiper 1 to be locked to the arm 3 in a nominal locking position.

For example, said arm 3 includes means 32 for guiding movement in translation of the arm 3 on the adapter 9 in a so-called mounting direction perpendicular to the pivot pin 14. Said movement in translation guide means 32 may also serve to retain said arm 3 on said adapter 9 in normal operation, notably in a direction perpendicular to the pivot pin 14 and to the windshield of the vehicle it equips, when the wiping system is in a situation of use.

Said means 32 for guiding movement in translation of the arm 3 on said adapter 9 notably include slides 33 facing each other. Said slides 33 here consist of bent edges of lateral faces 34 of said arms extending from an upper face 35 thereof, including said opening 30. Said slides 33 extend longitudinally in a longitudinal direction of the arm, i.e., when the arm 3 is mounted on the fixing device 2, in said mounting direction.

Referring also to FIGS. 3 and 4, it is seen that here the adapter 9 is configured to be inserted in the yoke 10 by movement in translation in said mounting direction until it reaches said nominal locking position. To this end the yoke 10 includes a distal opening 31 and the adapter 9 is configured to be introduced into said distal opening 31. The peg 21 is then in a retracted position until it reaches the opening 30, in which it engages reversibly.

Said adapter 9 may also be configured so that the means 32 for guiding movement in translation in said mounting direction serve as a locating abutment for the nominal position. They therefore determine the position in which the peg 21 is engaged in the opening 30. To this end, the adapter includes a so-called locking abutment 24, for example.

Here, said adapter 9 has lower edges 25 intended to cooperate with said slides 33, in particular to provide the guidance in translation during mounting.

The locking abutment 24 of the adapter 9 may be located so as to come into contact with a front longitudinal end 33b of said slides 33 during mounting.

Here said adapter 9 includes lateral flanges 50 to which said connector 8 is articulated by means of the orifice 51. Said adapter 9 defines between said lateral flanges 50 a housing for a portion of the connector 8 receiving said pivot pin 14. Here said lateral flanges 50 are connected to the upper face 22 and are symmetrical. The adapter therefore has a substantially U-shaped cross section.

In the example shown, the yoke 10 is of substantially hollow parallelepiped shape the front, rear and lower faces of which are open to allow the adapter 9 and the connector 8 attached to it to pass through. The lower face includes the slides 33 forming support means for the adapter 9 and on which the lower edges 25 of said adapter 9 bear. The lateral faces 34 of the yoke 10 are identical to each other, at least in their front end portion facing the adapter 9 once mounted.

Said adapter 9 also has a substantially parallelepiped shape with the retractable peg 21 on its upper face 22. The width of the adapter 9 is slightly less than the distance between the lateral faces 34 of the yoke 10 so that the adapter 9 may be inserted therein, but greater than the distance between the two slides 33 so that the latter can support it. The adapter 9 has at the level of its front face 61 a slot 63 (visible in FIG. 1) through which the wiper 3, and in particular its deflector 6, passes.

The adapter 9 includes a head 64 the contours of which are intended to line up with the yoke 10 in the nominal position, providing an abutment against movement in translation in said mounting direction for the upper face 35 and the lateral faces 34 of said yoke 10.

Here said head 64 is extended toward the rear by a flat 65 located along a lower edge of the lateral faces 50 and the end of which opposite the head defines the locking abutment 24.

It may be noted that the connector 8 has a longitudinal dimension, i.e. a dimension in the direction in which the wiper 1 extends, less than that of the adapter 9 so that it is concealed in said housing defined between the lateral flanges 50 of the adapter 9.

In accordance with a first embodiment of the invention, illustrated by FIGS. 3 and 4, said adapter 9 includes safety means 70 for retaining the arm in the nominal locking position in the event of failure of said retaining means 20. Said safety means 70 are configured to allow mounting and/or demounting of the adapter 9 on/from the arm 3 in normal operation.

A solution is thus provided enabling prevention of accidental separation of the arm 3 and the wiper 1 in the event of the peg 21 breaking.

In accordance with this first embodiment, the retaining means 70 are configured to act on the safety means so as to retract them during mounting and demounting of the adapter 9 on/from the arm 3, in particular in normal operation. To be more precise, when the peg 21 is depressed, the retaining means 70 are retracted, in the direction of the arrows 71, which allows the adapter 9 to be introduced into and/or withdrawn from the yoke 10 according to the movement in translation referred to above.

For example, the safety means 70 include at least one abutment 73 deformable in the direction indicated by the arrows 71, known as the retraction direction. Here it is provided with a deformable abutment 73 on each side of the adapter. Said deformable abutments originate from a rear edge 72 of the lateral flanges 50 of the adapter 9, for example, notably at the level of the ends of said rear edges 72 facing toward the lower edges 25 of the adapter. Here said deformable abutments 73 include an arm 74 connected to said rear edges 72 by one end and a head 75 connected to said arm 74 by its other end.

The safety means 70 may include a cam 76 acting on the deformable abutment or abutments 73 so as to drive them in said retraction direction 71. Here said cam 76 is configured to act on the heads 75 of said retractable abutments 73.

As shown in FIG. 3, in accordance with a first variant, said retraction direction is located in a plane perpendicular to the pivot pin 14. Here it is oriented in the direction of the windshield of the vehicle it equips. Said cam 76 may have a shape, notably a triangular, rectangular or trapezoidal shape, widening from the peg 21 in the direction of said heads 75 of the deformable abutments 73. In the nominal position, said cam 76 is in the vicinity of the heads 75 without deforming them. In the event of intentional pressure on the peg 21, said cam 76 pushes down the heads 75 of the deformable abutments 73, which enables mounting and/or demounting of the adapter 9, the heads 75 of the deformable abutments 73 then being able to pass under the slides 33 of the arm 3.

As shown in FIG. 6, in normal operation, the heads 75 of the deformable abutments 73 bear on the arm 3. In the event of failure of the peg 21 they remain in place and therefore make it possible for the fixing device 2 to continue to be locked in the arm 3. To be more precise, here said heads 75 of the abutments 73 are in contact with the rear end 33a of the slides 33. In this figure the mounting and/or demounting direction is indicated by the arrow 90.

As FIG. 4 shows, in accordance with a second variant, said retraction direction 71 is parallel to said pivot pin 14. Said cam 76 may take the form of a hook with a base 77 oriented along the pivot pin 14 and connected to the peg 21 and two guide rods 78 configured to engage in orifices 79 in the heads 75 of the deformable abutments 73. The guide rods 78 have a shape, notably a triangular shape, widening from their distal end, facing said orifices 79 in the heads 75 in the nominal position, toward the base 77 of the cam 76. They are separated from each other by a distance decreasing from their distal end to the base 77 of the cam 76.

In the nominal position, said cam 76 is in the vicinity of the heads 75 without deforming them. In the event of intentional depression of the peg, said cam 76 forces the deformable abutments 73 toward each other by engagement of the guide rods 77 in the orifices 79 of their head 75, which makes it possible to mount and/or demount the adapter 9, the heads 75 of the deformable abutments 73 then being able to pass between the slides 33.

As shown in FIG. 6, in normal operation, the heads 75 of the deformable abutments 73 bear on the arm 3. In the event of failure of the peg 21, they remain in place and therefore make it possible for the fixing device 2 to remain locked in the arm 3. To be more precise, here said heads 75 of the abutments 73 are in contact with the rear end 33a of the slides 33.

If the peg 21 breaks, the wiper is demounted by pressing with the fingers on the deformable abutments 73 in the direction indicated by the arrows 71.

In accordance with a third embodiment, shown in FIG. 7, the safety means 70 are located on the connector 8. In this embodiment, the adapter takes the same form as those from FIG. 3 or 4, for example, minus their deformable abutments 73. The wiper 1 and the arm 3 are notably identical to those of the previous embodiments.

For example, the safety means 70 include at least one abutment 80 holding the fixing device in the nominal position locked against the arm 3 in the event of failure of the peg 21, in particular if the wiper is pressed against the windscreen. Said abutment 80 further enables rotation of the arm about the pivot pin 14 of the adapter 9. It is therefore possible to mount and/or demount the arm 3 on/from the adapter 9.

In other words, in the nominal locking position, as shown in FIG. 7, the arm 3 is locked by the peg 21 and in the event of failure of the latter movement in translation of the arm 3 relative to the adapter 9 as shown by the arrow 81 is blocked by said abutment 80 of the safety means 70. For mounting and/or demounting the wiper 1 on/from the arm 3, the arm is free to rotate about the pin 14 and it suffices to pivot it through a few degrees for the arm 3 to be able to pass over said abutment 80 of the safety means 70. After applying pressure to the peg 21, it is then possible to mount and/or demount the wiper 1 by movement in translation in the direction 82.

To this end, in the nominal locking position, a small clearance is provided between the abutment 80 and the arm 3, corresponding to the necessary angular movement of the arm 4 to reach the position in which it can pass over the abutment 80. In other words, the abutment is configured to block mounting and demounting of the adapter 9 on/from the arm 3 if the angle of rotation of said arm and/or said adapter relative to their nominal locking position is less than a limit angle and to allow mounting and demounting of the adapter 9 on/from the arm 3 otherwise. Said limit angle is between 2 and 10°, for example, notably between 4 and 6°.

Here abutments 80 of the safety means 70 are provided on each side of the connector. Said abutments 80 are cantilevered relative to the lower part of the connector 8, in particular on either side of its ribs accommodating the vertebrae 5 of the wiper 1. They may be in one piece with said connector. They include an arm 83 extending toward a rear end 33a of the slides 33 from the lower portion of the connector 8 and an abutment head 84 located at the distal end of said arm 83. As shown in FIG. 7, said abutment heads 83 are in contact with said rear end 33a of the slides 32, notably in the event of failure of the peg 21.

In the various embodiments shown it is seen that the means for guiding movement in translation of the arm are configured to have a plurality of functions, that is to say, notably, a function of guiding movement in translation during mounting and/or demounting, in normal operation, and a locking function, by virtue of cooperation with the abutment or abutments of the safety means, in the event of failure of the retaining means. In fact, as already stated, the abutments of the safety means are then in contact with the slides 33, in particular with their rear ends 33a.

Here said slides 33 are the same length. In accordance with another variant, they may be different lengths, notably with the aim of enabling polarization between wipers intended to be mounted on a left-hand arm and a right-hand arm of the wiping system. Such polarization is particularly useful when the left-hand and right-hand wipers are not the same length. This polarization may be effected at the level of the front end 33b of the slides. The abutments 73, 80 of the safety means of each fixing device can therefore remain symmetrical on both sides.

This being so, an abutment 73, 80 of the safety means may also be provided on only one side of the adapter 9 or the connector 8.

It should be noted that other variant embodiments are of course possible. The support yoke 10 may notably be produced in the same material as the rest of the arm, and continuous with it.

The invention claimed is:

1. A device for fixing a windshield wiper to a drive arm of a wiping system, said device comprising:
   an elongated connector fixed to the wiper and defining a direction of elongation; and
   an adapter for connecting the connector to said drive arm, wherein the adapter is pivotally coupled to the connector,
   said adapter comprising a peg configured to retain the adapter in a nominal locking position on the drive arm,
   wherein said connector comprises at least one abutment, located on the connector and configured to retain the drive arm in the nominal locking position in the event of failure of said peg, wherein the at least one abutment is provided transversely on a free end of an elongated cantilevered arm, said cantilevered arm having one end fixed to the connector and extending rearwardly away therefrom in the direction of elongation to the free end, said at least one abutment being configured to allow mounting and/or demounting of the adapter on/from the drive arm in normal operation.

2. The device as claimed in claim 1, in which said adapter is connected to the connector with a degree of freedom in pivoting about a pivot pin.

3. The device as claimed in claim 2, in which said adapter is configured to be mounted on the arm in a so-called mounting direction located in a plane perpendicular to the pivot pin.

4. The device as claimed in claim 2, wherein the at least one abutment allows rotation of the arm about the pivot pin of the adapter.

5. The device as claimed in claim 4, wherein the at least one abutment is configured to block mounting and demounting of the adapter on/from the arm when the angle of rotation of said arm and/or said adapter relative to their nominal position is less than a limit angle and to allow mounting and demounting of the adapter on/from the arm otherwise.

6. A wiping system comprising a fixing device as claimed in claim 1.

* * * * *